US008346779B2

(12) United States Patent
Gelbard

(10) Patent No.: US 8,346,779 B2
(45) Date of Patent: Jan. 1, 2013

(54) METHOD AND SYSTEM FOR EXTENDED BITMAP INDEXING

(76) Inventor: Roy Gelbard, Tel Aviv (IL)

( * ) Notice: Subject to any disclaimer, the term of this patent is extended or adjusted under 35 U.S.C. 154(b) by 14 days.

(21) Appl. No.: 13/074,074

(22) Filed: Mar. 29, 2011

(65) Prior Publication Data

US 2012/0254192 A1 Oct. 4, 2012

(51) Int. Cl.
*G06F 7/00* (2006.01)
(52) U.S. Cl. ........................................ 707/745
(58) Field of Classification Search .................. 707/745, 707/603, 736, 602, 999.103, 802, 804
See application file for complete search history.

(56) References Cited

U.S. PATENT DOCUMENTS

| | | | |
|---|---|---|---|
| 5,649,181 A * | 7/1997 | French et al. ........................ | 1/1 |
| 5,907,297 A | 5/1999 | Cohen et al. | |
| 6,728,728 B2 * | 4/2004 | Spiegler et al. ............... | 707/603 |
| 7,685,104 B2 | 3/2010 | Ruhlow et al. | |
| 2002/0087567 A1 * | 7/2002 | Spiegler et al. ............... | 707/100 |
| 2011/0035354 A1 * | 2/2011 | Wan .............................. | 707/602 |

OTHER PUBLICATIONS

Israel Spiegler and Rafi Maayan; "Storage and Retrieval Considerations of Binary Data Bases" Information Processing & Management vol. 21, Issue 3, pp. 233-254 ,(1985).

Patrick E. O'Neil; "Model 204 Architecture and Performance" Presented at 2nd International Workshop on High Performance Transaction Systems, Sep. 1987.
Lee R. Dice; "Measures of the Amount of Ecologic Association Between Species" Ecology, vol. 26, No. 3, pp. 297-302 (1945).
Oracle® Database Data Warehousing Guide 10g Release 2 (10.2).
Chee-Yong Chan and Yannis E. Ioannidis; "Bitmap Index Design and Evaluation" SIGMOD '98.
Roy Gelbard, Israel Spiegler; "Hempel's Raven paradox: a positive approach to cluster analysis" Computers & Operations Research 27 305-320, (2000).
Roy Gelbard; ""Padding" Bitmaps to Support Similarity Andmining" Revised Version of ISFI263R1—Second Revision.
Bin Zhang and Sargur N. Srihari; "Properties of Binary Vector Dissimilarity Measures" (2003).

* cited by examiner

*Primary Examiner* — Hung T Vy
(74) *Attorney, Agent, or Firm* — The Law Office of Michael E. Kondoudis

(57) ABSTRACT

A system and method for enhancing bitmap indexing representation of a dataset, which comprises a plurality of cases and features, each case characterized by one or more values of each feature. Currently, the bins vector for each case in the dataset, is a binary array, which is a bitmap indexing representation of each respective feature of the case. The system and method enhance the bitmap indexing by padding each bins vector. The padding is carried out by identifying all target bit locations with a '1' value and replacing at least one '0' bit adjacent to a target bit location with a non-zero numerical value, thereby creating a padded bitmap index. The padding factor may be based on any mathematical or statistical factor concerning population or subpopulation relevant to each of the features of the dataset.

19 Claims, 9 Drawing Sheets

|   | Gender | Marital Status | Children |
|---|---|---|---|
| 1 | Male | Married | 4 |
| 2 | Male | Divorced | 2 |
| 3 | Female | Single | 0 |
| 4 | Male | Widow | 1 |
| 5 | Female | Single | 1 |
| 6 | Female | Married | 2 |

| Gender | | Marital Status | | | | Children | | | | |
|---|---|---|---|---|---|---|---|---|---|---|
| M | F | S | M | D | W | 0 | 1 | 2 | 3 | 4 |
| 1 | 0 | 0 | 1 | 0 | 0 | 0 | 0 | 0 | 0 | 1 |
| 1 | 0 | 0 | 0 | 1 | 0 | 0 | 0 | 1 | 0 | 0 |
| 0 | 1 | 1 | 0 | 0 | 0 | 1 | 0 | 0 | 0 | 0 |
| 1 | 0 | 0 | 0 | 0 | 1 | 0 | 1 | 0 | 0 | 0 |
| 0 | 1 | 1 | 0 | 0 | 0 | 0 | 1 | 0 | 0 | 0 |
| 0 | 1 | 0 | 1 | 0 | 0 | 0 | 0 | 1 | 0 | 0 |

Fig. 1

| Numerical Representation | 0.0 | 0.1 | 0.2 | 0.3 | 0.4 | 0.5 | 0.6 | 0.7 | 0.8 | 0.9 |
|---|---|---|---|---|---|---|---|---|---|---|
| 0.0 | 1 | 0 | 0 | 0 | 0 | 0 | 0 | 0 | 0 | 0 |
| 0.2 | 0 | 0 | 1 | 0 | 0 | 0 | 0 | 0 | 0 | 0 |
| 0.3 | 0 | 0 | 0 | 1 | 0 | 0 | 0 | 0 | 0 | 0 |
| 0.7 | 0 | 0 | 0 | 0 | 0 | 0 | 0 | 1 | 0 | 0 |
| 0.9 | 0 | 0 | 0 | 0 | 0 | 0 | 0 | 0 | 0 | 1 |

Fig. 2

| # | Padding Factor | The Sequences | | | | | | | | | | Dice |
|---|---|---|---|---|---|---|---|---|---|---|---|---|
| | | 0.0 | 0.1 | 0.2 | 0.3 | 0.4 | 0.5 | 0.6 | 0.7 | 0.8 | 0.9 | |
| 1 | P.F. = [0] | 0 / 0 | 0 / 0 | 1 / 0 | 0 / 0 | 0 / 0 | 0 / 0 | 0 / 0 | 0 / 1 | 0 / 0 | 0 / 0 | 0.00 |
| 2 | P.F. = [1] | 0 / 0 | 1 / 0 | 1 / 0 | 1 / 0 | 0 / 0 | 0 / 0 | 0 / 1 | 0 / 1 | 0 / 1 | 0 / 0 | 0.00 |
| 3 | P.F. = [2] | 1 / 0 | 1 / 0 | 1 / 0 | 1 / 0 | 1 / 0 | 0 / 0 | 0 / 1 | 0 / 1 | 0 / 1 | 0 / 1 | 0.00 |
| 4 | P.F. = [3] | 1 / 0 | 1 / 0 | 1 / 0 | 1 / 0 | 1 / 0 | 0 / 1 | 0 / 1 | 0 / 1 | 0 / 1 | 0 / 1 | 0.33 |
| 5 | P.F. = [4] | 1 / 0 | 1 / 0 | 1 / 0 | 1 / 1 | 1 / 1 | 1 / 1 | 0 / 1 | 0 / 1 | 0 / 1 | 0 / 1 | 0.57 |
| 6 | P.F. = [5] | 1 / 0 | 1 / 0 | 1 / 1 | 1 / 1 | 1 / 1 | 1 / 1 | 1 / 1 | 1 / 1 | 0 / 1 | 0 / 1 | 0.75 |
| 7 | P.F. = [6] | 1 / 0 | 1 / 1 | 1 / 1 | 1 / 1 | 1 / 1 | 1 / 1 | 1 / 1 | 1 / 1 | 1 / 1 | 0 / 1 | 0.89 |
| 8 | P.F. = [7] | 1 / 1 | 1 / 1 | 1 / 1 | 1 / 1 | 1 / 1 | 1 / 1 | 1 / 1 | 1 / 1 | 1 / 1 | 1 / 1 | 1.00 |

Fig. 3

| | PW | PL | SW | SL |
|---|---|---|---|---|
| Min. Value | 0.1 | 1 | 2 | 4.3 |
| Max. Value | 2.5 | 6.9 | 4.4 | 7.9 |
| Min. Interval | 0.1 | 0.1 | 0.1 | 0.1 |
| Number of Bins | 25 | 60 | 25 | 37 |

Fig. 4

| # | Padding Factor | Illustrative Sequences | | | | | | | | | |
|---|---|---|---|---|---|---|---|---|---|---|---|
| | | 0.0 | 0.1 | 0.2 | 0.3 | 0.4 | 0.5 | 0.6 | 0.7 | 0.8 | 0.9 |
| 1 | Symmetric L[2];R[2] | 1 | 1 | 1 | 1 | 1 | 0 | 0 | 0 | 0 | 0 |
| | | 0 | 0 | 0 | 0 | 0 | 1 | 1 | 1 | 1 | 1 |
| 2 | Asymmetric L[1];R[3] | 0 | 1 | 1 | 1 | 1 | 0 | 0 | 0 | 0 | 0 |
| | | 0 | 0 | 0 | 0 | 0 | 0 | 1 | 1 | 1 | 1 |

Fig. 10A

| # | Probabilities | Illustrative Sequences | | | | | | | | | | |
|---|---|---|---|---|---|---|---|---|---|---|---|---|
| | | 0.0 | 0.1 | 0.2 | 0.3 | 0.4 | 0.5 | 0.6 | 0.7 | 0.8 | 0.9 | 1.0 |
| 1 | Symmetric P.F.=[2] | 1 | 1 | 1 | 1 | 1 | 0 | 0 | 0 | 0 | 0 | 0 |
| | | 0 | 0 | 0 | 0 | 0 | 1 | 1 | 1 | 1 | 1 | 0 |
| 2 | Symmetric Probabilities | ▓ | ▓ | 1 | ▓ | ▓ | 0 | 0 | 0 | 0 | 0 | 0 |
| | | 0 | 0 | 0 | 0 | 0 | ▓ | ▓ | 1 | ▓ | ▓ | 0 |
| 3 | Asymmetric Probabilities | ▓ | ▓ | 1 | ▓ | ▓ | 0 | 0 | 0 | 0 | 0 | 0 |
| | | 0 | 0 | 0 | 0 | 0 | ▓ | ▓ | 1 | ▓ | ▓ | 0 |
| 4 | Asymmetric Probabilities | 0 | ▓ | ▓ | ▓ | ▓ | ▓ | 0 | 0 | 0 | 0 | 0 |
| | | 0 | 0 | 0 | 0 | 0 | ▓ | 1 | ▓ | ▓ | ▓ |  |
| 5 | Asymmetric Probabilities | 0 | ▓ | 1 | ▓ | ▓ | ▓ | 0 | 0 | 0 | 0 | 0 |
| | | 0 | 0 | 0 | 0 | 0 | ▓ | ▓ | 1 | ▓ | ▓ | 0 |

Fig. 10B

METHOD AND SYSTEM FOR EXTENDED BITMAP INDEXING

TECHNICAL FIELD

The present invention generally relates to data representation and more particularly to bitmap indexing representation format of data.

BACKGROUND ART

Bitmap indexing of datasets is a known technique, which enables efficient data storage and retrieval. Bitmap indexing was first introduced by Spiegler and Maayan (Spiegler, I., and Maayan, R., "Storage and Retrieval Considerations of Binary Data Bases", Information Processing & Management, Vol. 21,3 pp. 233-254, 1985). Bitmap indexing allows representing of alphanumeric data and stores the data as bitmaps or bit vectors, which include binary representation of the original data. However, this binary representation is often restricted to nominal or categorical discrete attributes and is usually inefficient in representing ordinal and continuous data.

Bitmap indexing is widely used in database technologies such as DB2 and Oracle (O'Neil 1987, "*Model* 204 *Architecture and Performance*", Lecture Notes in Computer Science, Vol. 359, Proceedings of the 2$^{nd}$ International Workshop on high Performance Transaction Systems, pp. 40-59; and Oracle 1993, "*Database Concept—Overview of Indexes—Bitmap Index*", Retrieved July 2010, from Oracle site: http://download.oracle.com/docs/cd/B19306_01/server.102/b14223/indexes.htmnumbersthref1008) as well as in data warehouses technologies such as Sybase, IQ and others. Chee Yong Chan and Yannis E. Ioannidis, for example (Chee Yong Chan and Yannis E. Ioannidis, "Bitmap Index Design and Evaluation", *Proceedings of the* 1998 *ACM SIGMOD international conference on Management of data*", Seattle, Wash., pp. 355-366) examined the bitmap indexes in terms of memory space and query-based retrieval time and also examined the impact of bitmap compression and buffering on the space-time.

The bitmap index of a dataset creates a storage scheme according to which the dataset is viewed as a two-dimensional matrix that relates entities to all attribute values. The rows in this matrix represent the various entities and the columns represent attributes or features, where a binary '1' or '0' value is given at each location of the matrix—its location representing the value's associated entity and feature.

A bitmap index representation does not preserve the natural numeric capability to identify or associate close numerical values, which is essential in data mining, classification, data retrieval through queries, data clustering and the like.

Bitmap Indexing: Definition

Suppose we have n entities. For each entity, we construct a binary vector that represents the values of its attributes in binary form, as follows. Suppose that for each entity i (i=1, 2, ..., n) we have m attributes, a1, a2, ..., am. The domain of each attribute aj is all its possible values, where pj is the domain size. We assume that for each attribute aj (j=1, 2, ..., m), its domain consists of pj mutually exclusive possible values; i.e., for each attribute aj, an entity can attain exactly one of its pj domain values. Denoting the kth value of attribute aj (j=1, 2, ..., m; k=1, 2, ..., pj) by ajk, we can represent the domain attributes vector of all possible values of all m attributes as: (a11, a12, ..., a1p1, a21, a22, ..., a2p2, ..., am1, am2, ..., ampm)

Denoting the length of the domain attributes vector by p, we have:

$$p = \sum_{j=1}^{m} p_j$$

We define the binary vector, of length p, for each entity i (i=1, 2, ..., n) in the following way: $x_{ijk}=1$ if for entity i, the value of attribute j is $a_{jk}$
0 otherwise
i=1, 2, ..., n
j=1, 2, ..., m
k=1, 2, ..., $p_j$
$x_{ijk}$ is the corresponding value for the k$^{th}$ value of attribute j ($a_{jk}$) for entity i, where $x_{ijk}$ is either '1' or '0', indicating that a given entity has or does not have a given value $a_{jk}$ for attribute j, respectively.

The binary vector, of length p, for entity i, is given by: ($x_{i11}$, $x_{i12}$, ..., $x_{imp^m}$)

We can express the mutual exclusivity property assumption for each entity and for each attribute over its domain, for each i and j, as:

$$\sum_{k=1}^{p_j} x_{ijk} = 1 (i = 1, 2, \ldots, n; j = 1, 2, \ldots, m)$$

This yields the sum of all the 1's in each binary vector as the number of attributes, m, i.e., for each i, $$\sum_{j=1}^{m}\sum_{k=1}^{p_j} x_{ijk} = m (i = 1, 2, \ldots, n)$$

For Example, as illustrated in table 10 shown in FIG. 1, suppose we have entities with three (m=3) attributes:

Attribute 1: Gender: with two (p1=2) mutually exclusive values M (male), F (female).

Attribute 2: Marital status: with four (p2=4) mutually exclusive values S (single), M (married), D (divorced), W (widowed).

Attribute 3: Education with five (p3=5) mutually exclusive values: 1 (elementary), 2 (high school), 3 (college), 4 (undergraduate), and 5 (graduate).

We have the domain attributes vector of length p=p1+p2+p3=2+4+5=11:
($a_{11}$, $a_{12}$, $a_{21}$, $a_{22}$, $a_{23}$, $a_{24}$, $a_{31}$, $a_{32}$, $a_{33}$, $a_{34}$, $a_{35}$)=(M, F, S, M, D, W, 1, 2, 3, 4, 5)

Now, suppose that the first entity (person), i=1, is a married graduate man; its binary vector is then: (1, 0, 0, 1, 0, 0, 0, 0, 0, 0, 1) which are all discrete attributes.

Bitmap Indexing: Similarity Measures

Calculating similarity among data records is a fundamental function in diverse data mining techniques.

Hierarchical clustering algorithms, for example, use the squared Euclidean distance as the likelihood-similarity measure. This measure calculates the distance between two samples as the square root of the sums of all the squared distances between their properties. Generally speaking, it is possible to differentiate these algorithms by means of the values assigned to variables A, B, and C in the general formula used to calculate the likelihood-similarity between object z and two unified objects (xy), producing a distance-similarity index:

$$D(xy)z = A_x*D_{xz} + A_y*D_{yz} + B*D_{xy} + C*|D_{xz} - D_{yz}|$$

In each algorithm, the variables A, B and C attain different values as illustrated in the following table:

| Technique | Ax | Ay | B | C |
|---|---|---|---|---|
| Nearest neighbor | 0.5 | 0.5 | 0 | −0.5 |
| Farthest neighbor | 0.5 | 0.5 | 0 | 0.5 |
| Median | 0.5 | 0.5 | −0.25 | 0 |
| Centroid | Nx/(Nx + Ny) | Ny/(Nx + Ny) | −Ax * Ay | 0 |
| Group average | Nx/(Nx + Ny) | Ny/(Nx + Ny) | C | 0 |
| Ward's method | (Nz + Nx)/(Nx + Ny + Nz) | (Nz + Ny)/(Nx + Ny + Nz) | −Nz/(Nx + Ny + Nz) | 0 |

In the same way, it is possible to differentiate other type of clustering-classification-mining algorithms as well as other likelihood-similarity-association measures.

However, these likelihood-similarity measures are applicable only to ordinal/continuous attributes and cannot be used to classify nominal, discrete, or categorical attributes.

For nominal attributes, similarity measures such as Dice (Dice 1945, "*Measures of the Amount of Ecological Association between Species*", Ecology Vol. 26, pp. 297-302) are used. Additional nominal-similarity measures are presented and evaluated (Gelbard R. and Spiegler I. 2000, "*Hempel's Raven Paradox: A Posotive Approach to Cluster Analysis*", Computer and Operation Research, Vol. 27(4), pp. 305-320; and Zhang B. and Srihari S. N. 2003, "Properties of Binary Vector Dissimilarity Measures", In JCIS CVPRIP 2003, Cary, N.C., pp. 26-30); all of them take into account positive values alone, i.e., the '1' bits. According to the Dice index, the similarity between two binary sequences is as follows:

$$0 \le \frac{2N_{ab}}{N_a + N_b} \le 1$$

Where: $N_a$=the number of '1's in sequence a.
$N_b$=the number of '1's in sequence b.
$N_{ab}$=the number of '1's common to both a and b.

Bitmap Indexing: Diverse Purposes

A U.S. Pat. No. 6,728,728 by Spiegel and Gelbard discloses a knowledge tool, which includes a binary dataset (bitmap-index) for representing and a general method for grouping (clustering-classifying) the stored objects. The grouping is based on an algorithm that applies the similarity indices directly on the raw data in its bitmap-indexed form, that is to say directly on the binary matrix.

Another U.S. Pat. No. 7,685,104 by Ruhlow Randy W. et. al discloses a method, system and article of manufacture for query execution management in a data processing system and, more particularly, for managing execution of information retrieval queries having one or more related query conditions. One embodiment provides a method for managing execution of a query against data of a database. The method comprises receiving a current query against the data of the database, the current query including a plurality of query conditions, for each query condition of the plurality of query conditions, determining whether a previously generated dynamic bitmap index can be re-used for the query condition of the current query, the dynamic bitmap index having been previously generated for a previous query condition associated with a previous query executed against the data of the database; and if the dynamic bitmap index has been generated for the previous query condition, retrieving the dynamic bitmap index, and determining a query result for the current query using all retrieved dynamic bitmap indexes.

Another U.S. Pat. No. 5,907,297 by Cohen Jeffrey et. al discloses a method and apparatus for compressing data is provided. The invention compresses an input bit stream into a compressed output bit stream. The input bit streams are byte aligned and classified. Bytes with all bits set to value zero are classified as gap bytes. Bytes with only one bit set to value one are classified as offset bytes. All other bytes are classified as map bytes. Groups of adjacent bytes are organized into two types of groups. The first type is a gap bit group. A gap map group contains gap bytes and one offset byte. The second type is the gap map group. It contains gap bytes and map bytes. The number of gap bytes in a group is called a gap size. The groups are compressed into four types of atoms. Each type of atom has one control byte, zero or more gap size bytes, and zero or map bytes. A control byte describes the atom. The map bytes in an atom are copies of the map bytes in the control group.

All these above-mentioned references relate to the bitmap indexing techniques known in the art, which take the alphanumeric data in the database according to the database structural features and transforms this data into binary vectors representing values and features thereby. Yet, bitmap-indexing is still limited to nominal discrete attributes and does not properly support continuous data. Moreover, bitmap-index representation does not preserve the natural numeric capability to "bind" close numerical values, which is fundamental to similarity-distance calculations as to data classification, data clustering and data mining techniques.

SUMMARY OF INVENTION

According to some embodiments of the present invention, there is provided a system of bitmap indexing of a dataset, which comprises a plurality of cases and features, each case characterized by one or more values of each feature. The system comprises a padding module, which receive a set of bins vectors each is a mutually exclusive representation of at least one value associated with each feature of the respective case. The bins vector is an array comprising a plurality of bits with values of '0' or '1'. Each bins vector is a bitmap indexing of the respective feature, where the padding module enhances each bins vector by identifying all target bit locations with a '1' value and replacing at least one '0' bit adjacent to a target bit location with a non-zero numerical value, thereby creating a padded bitmap index of each bins vector. The system may further comprise one or more storage units for enabling storing all the padded bitmap indexes therein, thereby creating an enhanced dataset of padded vectors representation of all the features of all the cases in the original dataset. The padding may be carried out by one or more processing units.

Optionally, the system further comprises a bitmap indexing module, which creates, for each case in the dataset, the respective bins vector where the bitmap indexing module is operated by one or more processing units, which carry out the bitmap indexing.

Additionally or alternatively, the padding module further enables determining a suitable padding factor associated with each feature of the dataset, prior to carrying out the padding of the bitmap index. The padding factor represents the number and location of adjacent bits to be replaced in the bitmap index, where the padding is carried out according to the determined padding factor. The determining of said suitable padding factor may be based on any mathematical or statistical factor concerning population or subpopulation relevant to each of the features of the dataset, such as, for example, based first and/or second derivative degrees of the population distribution of each the feature of the dataset.

Additionally or alternatively, the system further comprises a data handling module, which uses the padded bins of a dataset for handling the data such as for data mining, data clustering, data classification and/or identification of similarities between cases or sets of cases of the dataset. The data handling module may be operated by one or more processing unit, and may enable retrieving the padded bins vectors from the storage unit.

According to some embodiments of the invention, the non-zero numerical value replacing each adjacent '0' bit is a '1' bit, thereby creating a binary padded bitmap indexing representation of the respective feature of each respective case.

According to other embodiments of the present invention, the non-zero numerical value replacing each adjacent '0' bit is a numerical value representing a probability factor associated with the original value of the respective feature of the respective case. This probability factor representation may be an integer or a non-integer number. The said probability value may be determined according to at least one condition, which relates to the original value of the respective feature of the respective case. For example, the condition may be if the original value is higher and/or lower than a predefined maximal and/or minimal threshold.

According to some embodiments of the present invention, there is provided a computer implemented method of bitmap indexing of a dataset. The dataset comprises a plurality of cases and features, each case characterized by one or more values of each feature. Each feature may include nominal, ordinal, continuous and/or fuzzy variable.

The method may include providing a bins vector, for each case in the dataset, which is a mutually exclusive representation of at least one value associated with each feature of the respective case. the bins vector is an array comprising a plurality of bits with values of '0' or '1', which is a bitmap indexing representation of the respective feature of the respective case. The method further includes padding each bins vector by identifying all target bit locations with a '1' value and replacing at least one '0' bit adjacent to a target bit location with a non-zero numerical value, thereby creating a padded bitmap index. The method may further include storing all padded bitmap indexes in a physical storage unit, creating a padded dataset thereby.

Optionally, the method further includes determining a suitable padding factor associated with each feature of the dataset, prior to carrying out the padding of the bitmap index, where the padding factor represents the number and location of adjacent bits to be replaced in the bitmap index. The padding itself is then carried out according to the determined suitable padding factor. The determining of the suitable padding factor may be based on population distribution of each of features of the dataset, such as on first and/or second derivative degrees of the population distribution of each feature of the dataset.

According to some embodiments of the present invention, the non-zero values are added symmetrically on both sides of the target bit locations.

According to some embodiments of the present invention, the non-zero values are added asymmetrically on both sides of the target bit locations.

According to some embodiments of the present invention, the padded dataset may be used for determining similarities between different cases or features by comparing non-zero numerical values, such as '1' bits or probability factors, in matching locations in a plurality of different padded bitmap indexes of the same dataset.

BRIEF DESCRIPTION OF DRAWINGS

FIG. 1 shows a table, schematically illustrating an alphanumeric representation of six cases and their corresponding bitmap indexing representation as bins vectors;

FIG. 2 shows a table, schematically illustrating a bitmap indexing representation of a set of non-integer numbers;

FIG. 3, shows a table schematically illustrating various padded bitmap indexing representations of two original bitmap indexes, according to various padding factors, according to some embodiments of the present invention;

FIG. 4 shows a table indicating all minimal and maximal values of four features of Fisher's Iris Dataset (Sepal Length, Sepal Width, Petal Width, Petal Length);

FIG. 10A shows a table which illustrates a symmetrical and an asymmetrical padding of a bitmap indexes, according to some embodiments of the present invention; and FIG. 10B shows a table schematically illustrating padded bins vectors, which were padded according to different padding techniques and padding factors such as according to symmetric and asymmetric padding as well as according to probability based padding, according to some embodiments of the present invention.

MODES FOR CARRYING OUT THE INVENTION

Figure 5A:
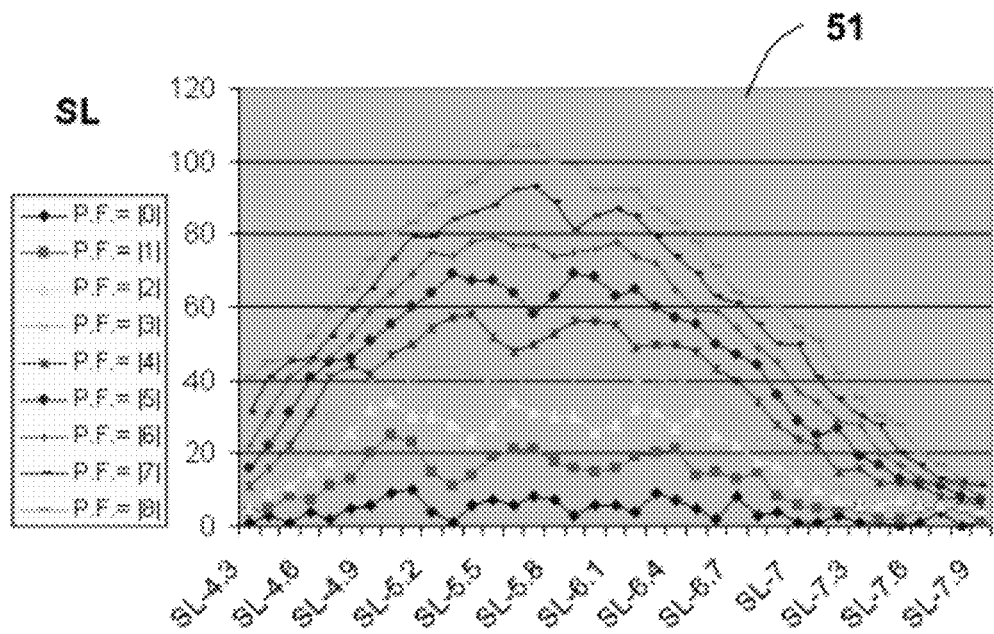
FIG. 5A shows probability function histograms of Sepal Length (SL) measurements according to various padding factors calculated for the Fisher's Iris Dataset.

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

The present invention, in some embodiments thereof, provides methods and systems for enhancing bitmap indexes especially yet not exclusively for purposes of managing, mining, clustering, classification and association of data.

The dataset may be a database or a data structure associating features, also referred to as "attributes" with cases (also known as records). According to some embodiments of the present invention, each case is characterized by one or more values of each feature. The values may be any alphanumeric representation of values whether nominal, binary, ordinal, continuous, fuzzy and/or any other representation as known in the art. Therefore, each value in the dataset is associated with at least one case and/or at least one feature or attribute.

According to some embodiments of the present invention, for each case in the dataset a bins vector is created or provided, which is the bitmap indexing of attributes of a specific case and is a binary vector. The bins vector is a mutually exclusive representation that is to say that exactly one value is associated with each feature of the case.

The bins vector, which is a bitmap index of the respective case, is an array containing a plurality of values arranged in a specific order such as bits with values of '0' or '1' or alternatively an array of integer and/or non-integer values. The bins vector is then enhanced or "padded" by identifying all target bit locations with a '1' value and replacing at least one '0' bit adjacent to a target bit location with a '1' bit, thereby creating a padded bitmap index. The padding is done, mainly but not exclusively, to recover some of the implicit similarity inherent in the alphanumerical scale that may have gotten lost in the bitmap-index representation (as previously mentioned bitmap-index representation does not preserve the natural numeric capability to "bind" close numerical values). The conversion of the attribute represented by alphanumeric values into a binary vector is referred to hereinafter as the "binning stage" or "binning step". The padding of each of the binary vectors is referred to hereinafter as the "padding stage" or "padding step".

FIG. 1 includes a table 10 schematically illustrating an alphanumeric representation of six cases and their corresponding bitmap indexing representation as bins vectors, according to some embodiments of the invention. In this illustrative case, each case represents a number of features of a person: gender, marital state and the number of children. As shown in the table 10 in FIG. 1 the bins vector representing the first case of a married male having four children is [10010000001]. It is easy to see that the location of '1' bits is indicative of the value or meaning which was presented in the alphanumeric data. The bitmap indexing therefore requires a known-in-advance data structure in which each bit location represents a value and/or a feature of a generic case. This means that the generic cases in a dataset should be divided into values (also referred to as attributes) where the location of each bit represents this feature and/or value.

FIG. 2 is a table 20, schematically illustrating attributes which have the following values: {0.0, 0.2, 0.3, 0.7 and 0.9}, where the minimal value is 0.0 and the maximal value is 0.9. The minimal interval between values is 0.3-0.20=0.1.. In this case, the binning step can be illustrated by the table 20 presented in FIG. 2.

FIG. 2 shows, according to this example, that the value 0.0 is represented by a bins vector: [1000000000]; the value 0.3 is represented by the bins vector: [0001000000]; etc.

Although such a representation is precise in this case and preserves data accuracy; i.e., there is neither loss of information nor rounding off of any value, mutual exclusivity of the binning representation causes the "isolation" of each value. Normally and intuitively, we assume that 0.2 is closer-similar to 0.3 than to 0.7; but in converting such values into bitmap representation we lose those basic numerical relations.

Those numerical relations are highly essential for classification, clustering, mining and/or managing of data, which require similarity-distance calculations, which enable identification of relations between cases in the dataset by identifying similarities between cases or sets of cases. For these purposes, the present invention, according to some embodiments thereof, provides a technique for enhancing each bins vector by "padding" it in a manner that will improve identification of similarities between cases or sets of cases.

According to some embodiments of the present invention, the padding involves replacing one ore more '0' bit that is located adjacent to the non-zero '1' bit(s) in this bins vector with a '1' bit.

According to some embodiments of the present invention, the padding is carried out according to one or more padding factors, which determine the number of adjacent '1' bits replacing '0' bits adjacent to the original '1' bit in each bins vector. The padding factor may be determined according to any mathematical or statistical factor related to a relevant population of cases. For example, the padding factor can be determined by any mathematical or statistical factor concerning population or subpopulation relevant to each of said features of said dataset such as, first and/or second derivative degrees of the attribute, which present marginal changing in the attribute's values. The relevant population can refers to the entire dataset, or to a subset, or if known, of the entire population.

FIG. 3 is a table 30, which shows eight line-pairs, each line-pair contains two rows of bins vectors each representing a different case: Line number 1 contains two rows, the first representing the value of 0.2 and the second representing the value of 0.7. Each of the following lines presents padding according to seven different padding factors.

Each line in table 30 illustrates different padding factor related to the values of 0.2 and 0.7 using binning of 0.1. The padding factor in line No. 2 is noted |1|, i.e., one additional '1' bit, on the right and left sides of the original '1' bin. Similarly, the padding factor in line No. 3 is |2|, i.e., it has two additional '1's on the right side and on the left side of the original '1' bin. This continues up to line No. 8, in which the padding factor is |7|. The original binary vectors (presented in line No. 1) have a padding factor of |0|. The right column in FIG. 3 presents the calculated similarity between the two vectors in each pair according to the Dice similarity index.

In this example, the padding is done symmetrically around the non-zero original '1' bit, unless the original non-zero bit is located near an end of the vector. In other cases the padding may be carried out only at one side of the non-zero bit, depending on definitions of the method and system, as illustrated in table 95 shown in FIG. 10A.

In many cases, it can be quite an intriguing job to determine the most suitable padding factor to work with since it depends on the data structure, the distribution of values of the relevant attribute, the binning rate, the similarity measure and others. The padding factor may be any relevant measure and/or parameter that illuminates the distribution/probability of the attribute and/or attribute's value in the relevant population and/or in the reference group. Additionally or alternatively, the padding measure can be any kind of parameter derived from the categorization method, used in the binning stage.

FIG. 4 shows a table 40 including minimal and maximal values of four attributes relating to a "Fisher's Iris dataset", which is a known dataset including measurements of petal and sepal lengths and widths of Irises. The Fisher's Iris Dataset is often referenced as a baseline in the field of data cluster analysis and data mining. The Fisher's Iris dataset contains 150 specimens from three types of Iris flowers, each specimen's record contains four continuous attributes: Petal Length (PL); Petal Width (PW); Sepal Length (SL); and Sepal Width (SW).

Figure 5B:
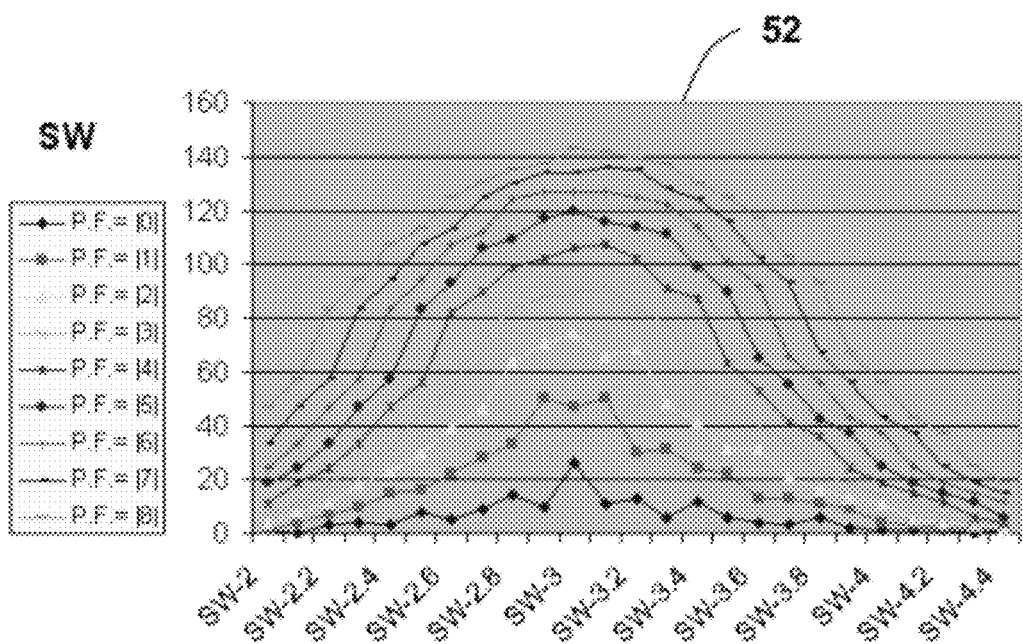
FIG. 5B shows probability function histograms of Sepal Width (SW) measurements according to various padding factors calculated for the Fisher's Iris Dataset.
Figure 5C:
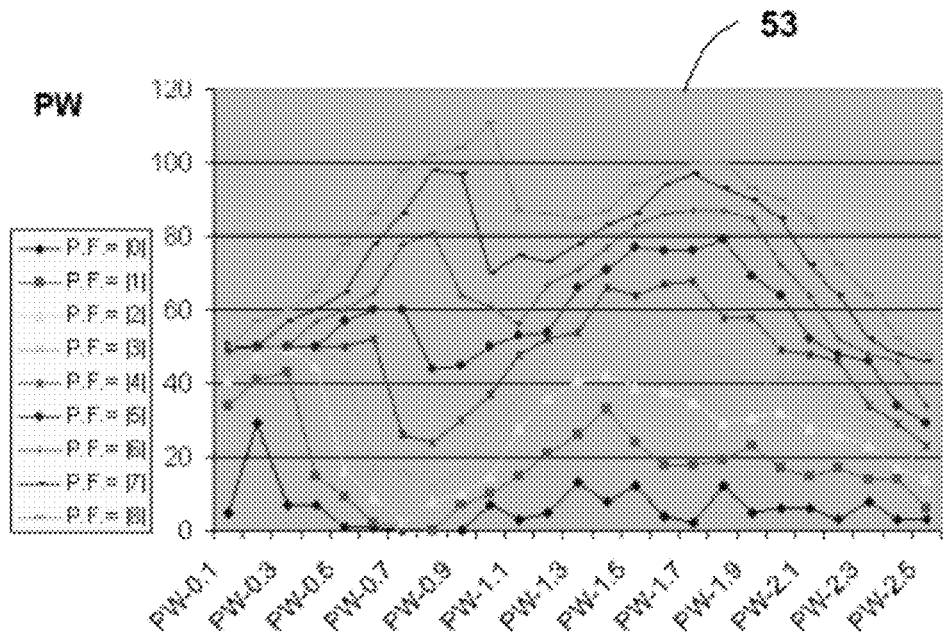
FIG. 5C shows probability function histograms of Petal Width (PW) measurements according to various padding factors calculated for the Fisher's Iris Dataset.

FIGS. 5A-5D show histograms, which are probability functions of each Iris attribute. FIG. 5A presents the SL attribute histograms 51; FIG. 5B the SW attribute histograms 52; FIG. 5C the PW attribute histograms 53, and FIG. 5D the PL attribute histograms 54. Each of FIGS. 5A-5D contains 9 histograms (lines) where each of the lines presents the probability function when using a different padding factor, starting with a padding factor of |0|, up to a padding factor of |8|. The X-axis presents the attribute's values (bin's value), starting with the respective Minimal value of the specific attribute and increasing up to the respective Maximal value thereof. The Y-axis presents the number of records having the current bin value, starting from 0 and ending at 150 (the total number of specimen records in Fisher's Iris dataset). Therefore, each line-histogram represents the probability function of a specific attribute's values at a specific padding rate.

The histograms in FIG. 5A show that at a padding factor of |8| the probability function of the SL attribute can be regarded as a normal distribution, whereas at a padding factor of |3| we can observe several midpoints.

FIG. 5B shows that, for almost all padding factors, the probability function of the SW attribute resembles a normal distribution.

FIG. 5C shows that that at padding factor of |2| the probability function of the PW attribute indicates three noticeable values, whereas at higher padding factors the distinction becomes vague.

Figure 5D:
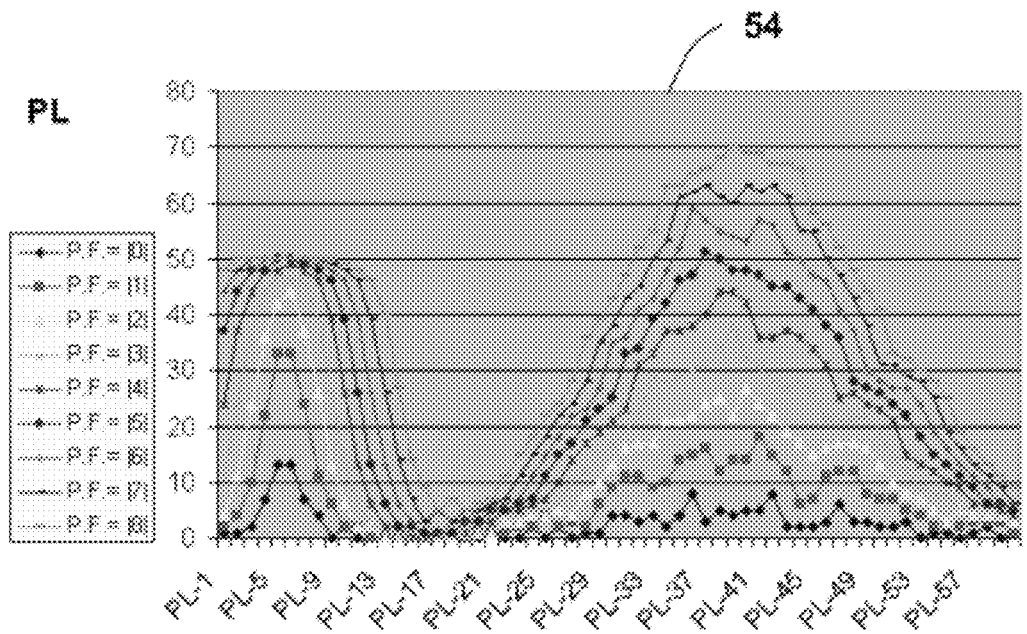
FIG. 5D shows probability function histograms of Petal Length (PL) measurements according to various padding factors calculated for the Fisher's Iris Dataset.

FIG. 5D illustrates a different phenomenon, in which for all padding factors the probability function of the PL attribute cannot be regarded as a normal distribution. However, we can identify at least two noticeable values, which probably indicate different Iris species. Such phenomena may probably suggest two clusters; however, at this point, given one attribute (the PL) we have no way to determine whether there are two or more clusters.

We can see that one or more techniques and mechanisms for determining the most suitable padding factor for each attribute or for all attributes is required and that not all attributes of the same dataset behave in the same manner statistically.

As shown in FIGS. 5A-5D, the probability function of each attribute changes when changing the padding factor. Therefore, in this exemplary case, the probability function is the key for determining the most suitable padding factor that will potentially yield maximal ordinality and optimal likelihood of each attribute.

Figure 6A:
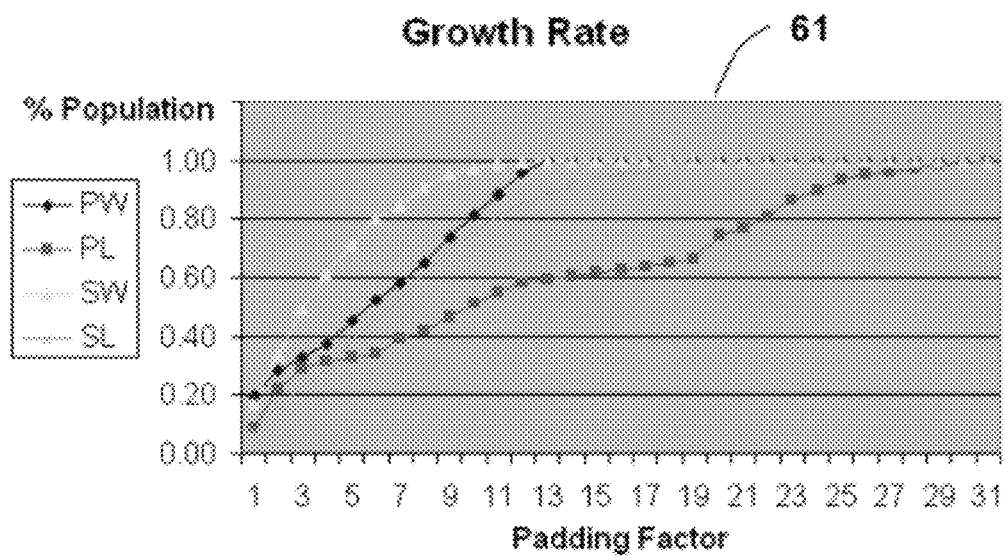
FIG. 6A shows growth rate curve of each of the features in the Fisher's Iris Dataset (SL, SW, PL and PW) corresponding to sequent increasing of the padding factor.

In this case, for example, the padding factor is based on derivation of the number of cases that reached a full similarity. As previously mentioned, diverse alternative are available including but not limited to distribution of the values in the Iris population or subpopulation, and others). The padding factor is based on the following calculations:

(i) First-order derivation degree, such as, growth rates of the probability function related to changes in the padding factor. The term "Growth Rate" refers to maximal percent of records with a common bin value, such as., the value of 1.00 is achieved when all 150 entities have a common bin value (such as full similarity). For example, the PW attribute, which has 24 possible padding factors (since there are 25 possible values in this attribute), reaches the value of 1.00 at a padding factor of 12. The term "Growth Derivation" refers to the first derivation of the Growth Rate. This is shown in FIG. 6A, which schematically illustrates the Growth Rate 61 of the population of each attribute versus the padding factor.

Figure 6B:
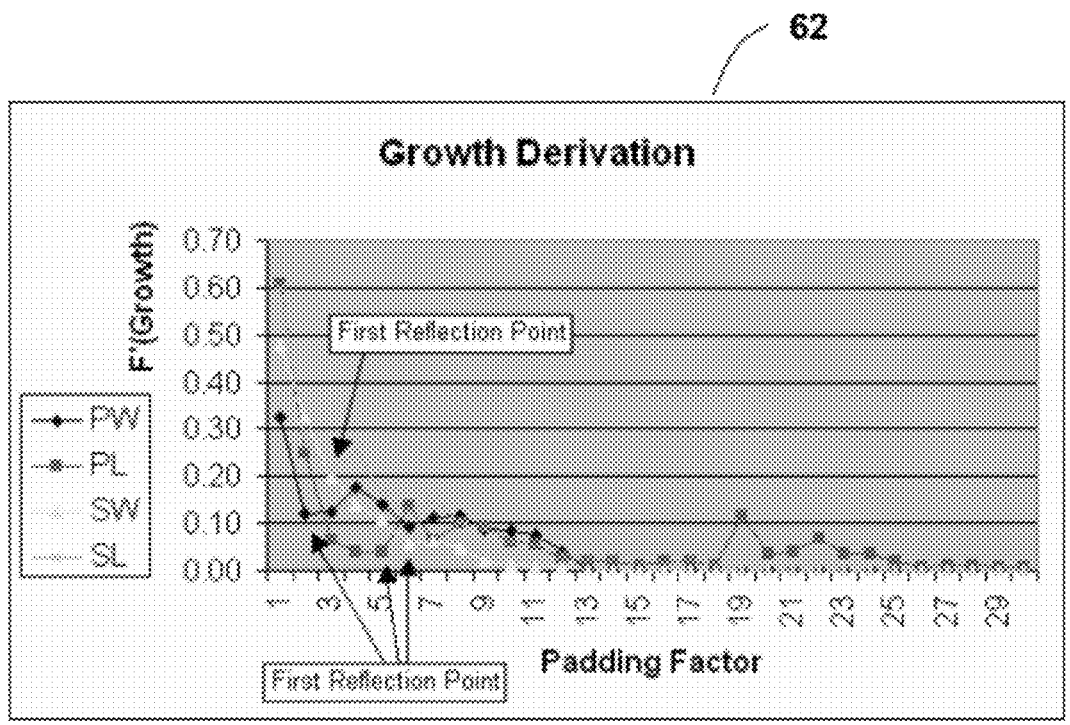
FIG. 6B shows derivation curves of the growth rate curves of each of the features in the Fisher's Iris Dataset (SL, SW, PL and PW) corresponding to sequent increasing of the padding factor.

(ii) Second-order derivation degree of the attribute domain, i.e., reflection points at the first-order derivation of the probability function. FIG. 6B shows the Growth Derivation 62 of the Growth Rates presented in FIG. 6A. In this case, as can be seen in FIG. 6B, the reflection points are the extremum points in each line, where each line represents a different attribute.

According to some embodiments of the present invention, according to this exemplary case, the most suitable padding factor of each attribute is the first local minima, i.e., the first reflection point in each respective graph of the Growth derivation. Since the Iris dataset contains 150 samples (records), the relevant padding factors are only those in which the probability function is less than 150.

Therefore, according to the results in FIG. 6B, the most suitable padding factors of each Iris attribute are: PW padding factor of |2|, i.e., each value is represented by 5 '1' bins; PL padding factor of |5|, i.e., each value is represented by 11 '1' bins; SW padding factor of |6|, i.e., each value is represented by 13 '1' bins; and SL padding factor of |3|, i.e., each value is represented by 7 '1' bins. In this case we determined that the padding is symmetric, meaning that for each original '1' bit in the initial bitmap index—the padding factor determines the number of '0' bits located adjacent to the original '1' bit will be replaced by '1' bits. For example if the padding factor is |2|—two adjacent '0' bits of each side of the original '1' bit in the bins vector will be replaced by '1' bits.

According to other embodiments of the present invention, the padding may be asymmetric meaning that the adjacent '0' bits from only one side of the original '1' bit of the bins vector may be replaced.

Figure 7:
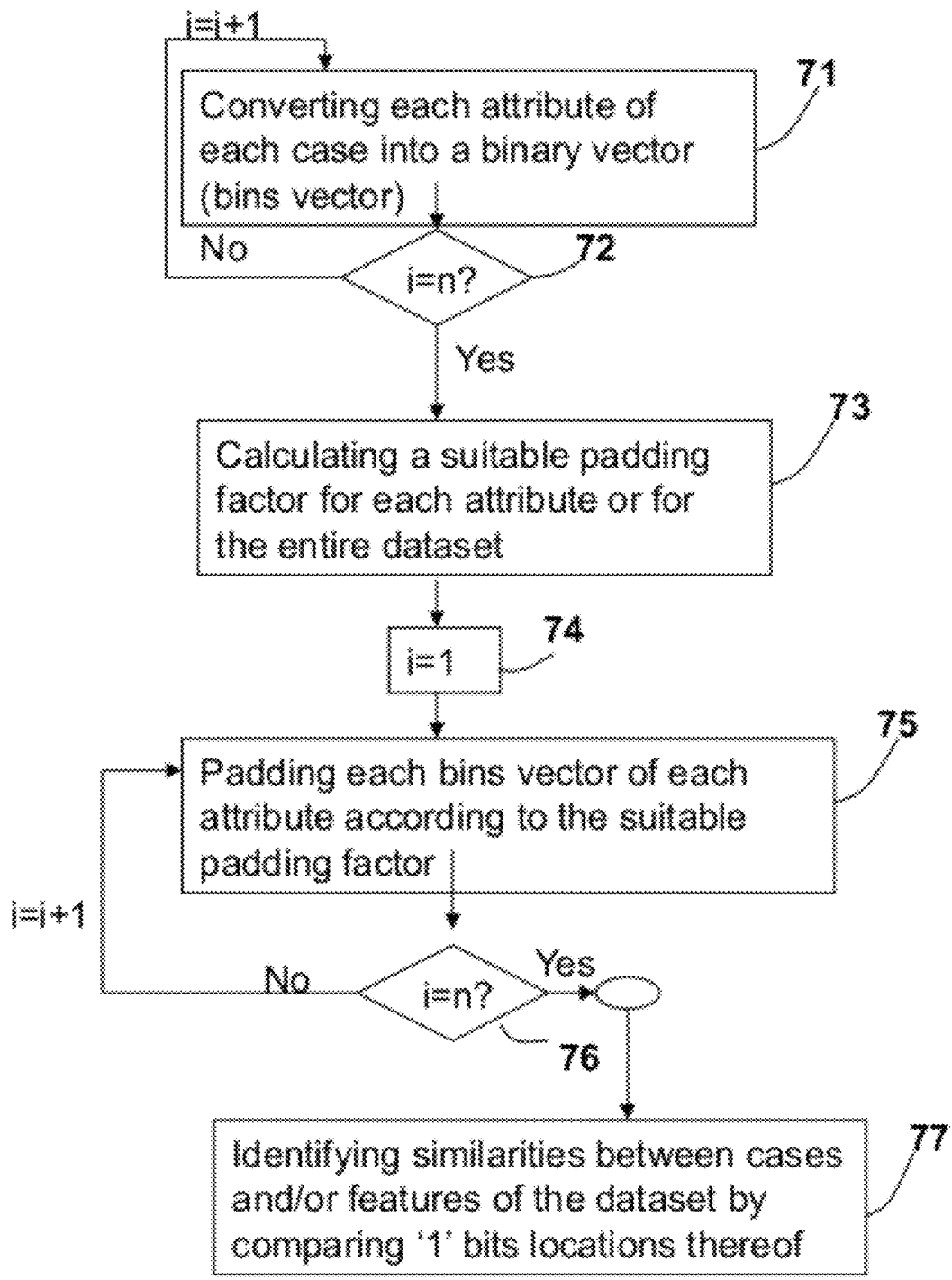
FIG. 7 is a flowchart schematically illustrating a process for providing an enhanced bitmap indexing representation of a dataset, according to some embodiments of the present invention.

Reference is now made to FIG. 7, which schematically illustrates a method for enhancing representation of data, according to some embodiments of the present invention. Each attribute of each case in the dataset is converted into a bitmap index which is a bins vector 71. The conversion may be carried out according to any bitmap indexing known in the art such as the conversion illustrated in the description of FIGS. 1-2. Once the dataset is converted we have a set of bins vector representing the entire dataset meaning all cases and attributes thereof Once the entire dataset is bitmap indexed 72, one or more optimal padding factors may be calculated 73. According to some embodiments of the present invention, for each attribute in the dataset a suitable padding factor may be calculated separately 73. As shown, for some datasets each attribute may have a different population distribution and therefore may require a separated calculation of its respective padding factor. Once the most suitable padding factor of all attributes is determined—each bins vector is padded 74-76 according to its respective padding factor. To clarify this— each attribute of each case is represented by a bins vector, which is the bitmap indexing representation thereof Each such bins vector is then padded according to the appropriate padding factor. This will result in an enhanced dataset comprising a set of padded bins vectors organized according to the different attributes. Each attribute may be allocated with a different indexing or indication (e.g. by positioning all bins vectors associated therewith at a different location in the data structure) to facilitate in data mining and/or clustering processes.

This enhanced dataset may be used for any type of data handling that requires identifying similarities between the same attributes of different cases 77, such as data mining, classification, clustering, and the like.

Since the padding reforms the drawback of bitmap-index representation that does not preserve the natural numeric capability to "bind" close numerical values; the padded bitmap indexes (or padded vectors) can improve identification of similarities between cases by using any similarities identification technique such as by using the Dice technique as previously described or any other technique available in the art.

The similarities identification may be used for classification, clustering or any other association-aggregation, which is done for improving data mining, according to some embodiments of the present invention.

There are many clustering techniques that can be used such as for example, a Two-Step clustering technique, which is an algorithm that is applicable to both ordinal (continuous) and nominal discrete (categorical) attributes. It is based on two passes of the dataset. The first pass divides the dataset into a coarse set of sub-clusters, and the second pass groups the sub-clusters into the desired number of clusters. This algorithm depends on the order of the samples and may produce different results based on the initial order. The desired number of clusters can be determined automatically or it can be a predetermined fixed number of clusters. We used the fixed number of clusters option in our analysis, so as to be able to use this algorithm in conjunction with the other algorithms chosen for this study.

Another clustering technique is the K-Means technique, which is also an algorithm that is applicable to both ordinal (continuous) and nominal discrete (categorical) attributes. One of the requirements for using this algorithm is that the number of clusters used to classify the dataset is predetermined. It is based on determining arbitrary centers for the desired clusters, associating the samples with the clusters by using a predetermined distance measurement, iteratively changing the center of the clusters and then re-associating the samples. The duration and complexity of the process are highly dependent on the initial setting of the cluster centers and can be improved when there is knowledge as to the location of these cluster centers.

Another set of clustering technique are the Hierarchical Methods. These are a set of algorithms that work in a similar manner. These algorithms take the dataset properties that need to be clustered and start by classifying the dataset such that each sample represents a cluster. Next, it merges the clusters in steps: each step merges two clusters into a single cluster, until there is only one cluster (the dataset) remaining. The algorithms differ in the way in which distance is measured between clusters, mainly by using two parameters: the distance, or likelihood, measure, e.g., Euclidean, Dice, etc. and the cluster method, e.g., between group linkage, nearest neighbor, etc.

Any known hierarchal method may be used for clustering the dataset, such as one of the following well known methods:

A first method known as the Within Groups Average method may be used. This method involves calculating the distance between two clusters by applying a likelihood measure to all the samples in the two clusters. The clusters with the highest average likelihood measure are then united.

A second method may be used known as the Between Groups Average method. This method involves calculating the distance between two clusters by applying the likelihood measure to all the samples of one cluster and then comparing it with all the samples of the other clusters. Again, the two clusters with the highest likelihood measure are then united.

A third method known as the Nearest Neighbor method may be used. This method involves calculating the distance between two clusters by applying the likelihood measure to all the samples of one cluster and then comparing it with all the samples of the other cluster. The two clusters with the highest likelihood measure, from a pair of samples, are then united.

A fourth method known as the Furthest Neighbor method may be used. This method, like the previous methods, includes calculating the distance between two clusters by applying the likelihood measure to all the samples of one cluster and then comparing it with all the samples of another cluster. For each pair of clusters, the pair with the lowest likelihood measure is taken. The two clusters with the highest likelihood measure of those pairs are then united.

A fifth method known as the Centroid method may be used. This method includes calculating a centroid of each cluster by calculating the mean average of all the properties for all the samples of each cluster. The likelihood measure is then applied to the means of the clusters and the clusters with the highest likelihood measure between their centroids are then united.

A sixth method known as the Median method may be used. This method includes calculating a median of each cluster. The likelihood measure is applied to the medians of the clusters and the clusters with the highest median likelihood are then united.

A seventh method known as the Ward's Method may be used. This method includes calculating a centroid for each cluster and the square of the likelihood measure of each sample in the cluster and the centroid. The two clusters which when united have the smallest (negative) effect on the sum of likelihood measures are the clusters that need to be united.

Many other methods, techniques and/or algorithms may be used for classification or clustering, including but not limited to Bayes-Nets, Neural-Nets, Regressions, Decision-Trees, Decision-Rules and others; and the above mentioned methods are presented only for the purpose of illustrating some of the currently available methods that can be used. In any case the enhanced bitmap indexes of the dataset may be used for any classification, clustering, similarity-association identification and/or any other data mining or data handling utilities. Moreover, any method, algorithm and/or technique may be used for determining the suitable padding factor for any particular dataset and the above mentioned methods are only given for the purpose of illustrating how the determining of the padding factor of some exemplary dataset may be carried out.

Figure 8:
FIG. 8 shows a table which represents a comparison between using a standard Fisher's Iris dataset for data clustering and using an enhanced dataset comprising padded bitmap indexing representation thereof, where the table shows the comparison results for nine different data clustering techniques and algorithms.

Reference is now made to FIG. 8, which includes a table 85 showing a matching evaluation for all above mentioned nine algorithms (methods). Each algorithm was tested twice, using the regular Iris dataset (continuous data), and then the padded bitmap representation format. The results show strong evidence for the efficiency of the combination of a padded bitmap representation and a binary similarity measure.

The initial bitmap indexing of the dataset, the padding thereof and the determining of the padding factor and/or the probability values of each attribute (feature) of each case of the dataset may be carried out by one or more modules, which may be any one or more computerized applications, programs and he like operated by one or more processors of any one or more computerizes systems such as a personal computer (PC), personal digital assistance (PDA) computer, a laptop, a server, and the like.

The bitmap indexing representation of the dataset and/or the padded representation of the dataset may be stored in one or more storage units such as one or more databases in computerizes systems operating the initial indexing and/or the padding or separated remote data storages.

Figure 9:
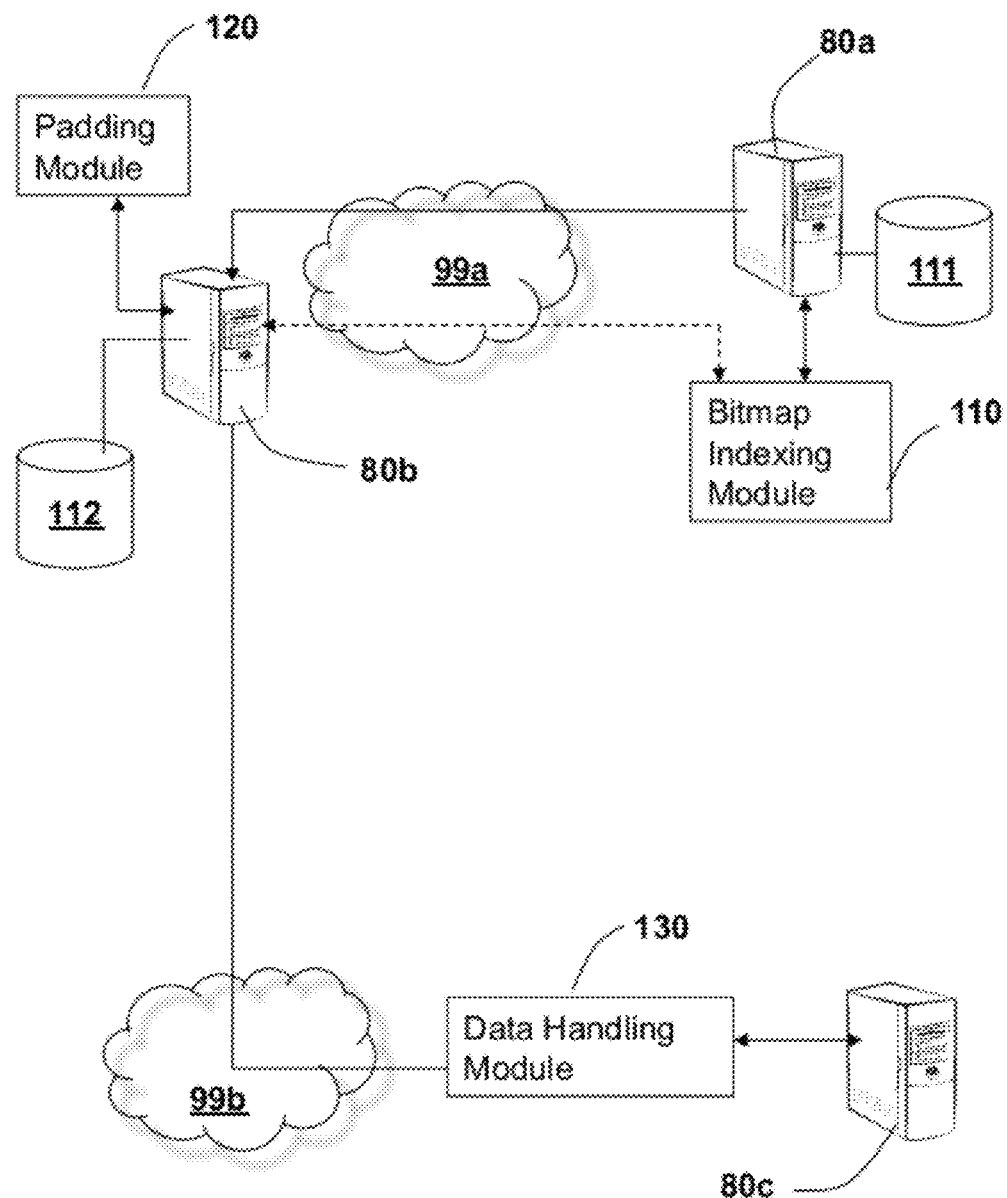
FIG. 9 is a block diagram, schematically illustrating a system for providing and using enhanced bitmap indexing representations of datasets, according to some embodiments of the present invention.

Reference is now made to FIG. 9, which is a block diagram schematically illustrating a system for enhancing bitmap indexing representation, according to some embodiments of the present invention. The system may include a bitmap indexing module 110, which receives a dataset that includes any type and structure of alphanumeric data that includes cases and attributes associated thereto (e.g. ordinal, continuous etc.) and converts each attribute representation of each case into a bitmap indexing representation, such as into a binary bins vector.

According to some embodiments of the present invention, as shown in FIG. 9, the bitmap indexing module 110 may be operated by one or more processing units such as through a computer processing unit 80a operatively associated with one or more data storage unit such as database 111 for storing bitmap indexing representation of the dataset, such as the bins vectors of all attributes of all cases.

Additionally, as shown in FIG. 9, the system may include a padding module 120, which may receive bitmap representation data of a dataset from the database 111 via one or more communication links such as communication link 99a or from any other source and pad each of the bitmap indexes (e.g. each of the bins vectors) according to one or more padding factors. The padding module 120 may additionally calculate a suitable padding factor for each attribute in the dataset according to one or more predefined algorithms. The padding module 120 may be operated by one or more processing units such as by a computerized processing unit 80b. The padded bitmap indexing representations may form an enhanced database, which may be stored in one or more data storages such as in database 112.

According to some embodiments of the present invention, as illustrated in FIG. 9, the padded bitmap indexes (or padded vectors) may be provided to a data handling module 130 which may carry out the classification, clustering and/or any other data mining utility, like and/or which identifies similarities, associations, coefficients or any other relation between cases and/or attributes according to one or more methods. The above mentioned relation may be identified to any purpose such as for data mining, classification, clustering and the like. The data handling module 130 may receive the padded vectors of the dataset from the database 112 using one or more communication links such as communication link 99b in which case the data handling module 130 may be operated by a different processing unit 80c. Alternatively, the data handling module 130 may be operated by the same processing unit 80b as the one operating the padding module 120 and/or the bitmap module 110.

The padding module 120 may use any method for determining the padding factors and for padding each bins vector, such as methods described above.

According to alternative or additional embodiments of the invention it is further suggested to restore Probabilistic-Bitmap representation of the attributes of each case of a dataset. According to these additional or alternative embodiments, the padded bins represent probabilities rather than binary values. In this case, there are additional symmetric and asymmetric forms as illustrated in lines 2-4, of table 96 in FIG. 10B.

Table 96, shown in FIG. 10B, presents five line-pairs, each line pair contains two rows in the same form as presented in table 30 in FIG. 3. Line number 1 contains two rows, the first representing the value of 0.2 and the second representing the value of 0.7. Both rows are symmetrically padded by two bits on their right side, and two bits on their left side.

Line number 2 replaces the padded bits with symmetric probabilities as commonly used for example in fuzzy techniques. For illustration purposes, it is assumed that the first nearby bin presents probability of 70% (0.7) and the second nearby bin presents probability of 30% (0.3).

Line number 3 presents asymmetric probability while the padding is still symmetric. Therefore, each value is padded by two additional values on its right and its left side, but the values on the right side (0.8 and 0.4) are not equal to those on the left side (0.3 and 0.1).

Line number 4 presents asymmetric padding and asymmetric probability. In this specific line the value is padded by one additional value on its left side, and three additional values on its right side, where the values on the first nearby bin are unequal: 0.1 on the left first nearby bin and 0.8 on the right first nearby bin.

Line number 5 presents additional combination of asymmetric padding and asymmetric probabilities, according to some embodiments of the present invention. In this case the distribution of the padded bins and the probability values are different for each case, depending on its original value. For example, if the original value of the bin is lower than 0.5 then it is padded with one bin on the left side and three bins on the right side, with a specific set of probability values. Otherwise, (the original value is equal or higher than 0.5) then the bin is padded with two bins on the left side and two bins on the right, with other set of probability values.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

Although the invention has been described in detail, nevertheless changes and modifications, which do not depart from the teachings of the present invention, will be evident to those skilled in the art. Such changes and modifications are deemed to come within the purview of the present invention and the appended claims.

The invention claimed is:

1. A computerized system of bitmap indexing of at least one dataset, said dataset comprising a plurality of cases and features, each case characterized by one or more values of each feature, said system comprising:
   i) a padding module, wherein one or more processors receive a set of bins vectors each is a mutually exclusive representation of at least one value associated with each feature of said respective case, wherein said bins vector is an array comprising a plurality of bits with values of '0' or '1', producing a bitmap indexing of said respective feature, said padding module enhances each said bins vector by identifying all target bit locations with a '1' value and replacing at least one '0' bit adjacent to a target bit location with a non-zero numerical value, thereby creating a padded bitmap index of each said bins vector, said padding module further enables determining a suitable padding factor associated with each feature of said dataset, prior to carrying out said padding of said bitmap index, said padding factor representing the number and location of adjacent bits to be replaced in the bitmap index, wherein said padding is carried out according to said determined padding factor; and
   ii) at least one storage unit for enabling storing all said padded bitmap indexes therein.

2. The system according to claim 1, wherein said padding is carried out by at least one processing unit.

3. The system according to claim 1 further comprising a bitmap indexing module, which creates, for each case in said dataset, the respective bins vector comprising a plurality of bits with values of '0' or '1', producing a bitmap indexing representation of said respective feature of said respective case, said creation of said bitmap indexing is carried out by at least one processing unit.

4. The system according to claim 1, wherein said determining of said suitable padding factor is based on at least one mathematical or statistical factor concerning population or subpopulation relevant to each of said features of said dataset.

5. The system according to claim 4, wherein said determining of said suitable padding factor is based on a quantitative factor, which comprises the following mathematical or statistical factors of: first and second derivative degrees of the population distribution of each said feature of said dataset.

6. The system according to claim 1 further comprising a data handling module, which uses said padded bins of said dataset for at least one of: data mining, data clustering, data classification and identification of similarities between cases or sets of cases of said dataset, said data handling module is operated by at least one processing unit, said data handling module further enables retrieving said padded bins vectors of said dataset from said storage unit for data handling thereof.

7. The system according to claim 1, wherein said non-zero numerical value replacing each said adjacent '0' bit is a '1' bit, thereby creating a binary padded bitmap indexing representation of said respective feature of said respective case.

8. The system according to claim 1, wherein said non-zero numerical value replacing each said adjacent '0' bit is a numerical value representing a probability factor associated with the original value of said respective feature of said respective case.

9. The system according to claim 8, wherein said probability value is determined according to at least one condition, said condition relates to the original value of said respective feature of said respective case.

10. A computer implemented method of bitmap indexing of at least one dataset, said dataset comprising a plurality of cases and features, each case characterized by one or more values of each feature, said method comprising:
   i) for each case in said dataset, providing a respective bins vector, which is a mutually exclusive representation of at least one value associated with each feature of said respective case, wherein said bins vector is an array comprising a plurality of bits with values of '0' or '1', producing a bitmap indexing representation of said respective feature of said respective case;
   ii) determining a suitable padding factor associated with each feature of said dataset, prior to carrying out said padding of said bitmap index, said padding factor representing the number and location of adjacent bits to be replaced in the bitmap index, wherein said padding is carried out according to said determined padding factor;
   iii) padding said bins vector by identifying all target bit locations with a '1' value and replacing at least one '0' bit adjacent to a target bit location with a non-zero numerical value, thereby creating a padded bitmap index; and
   iv) storing said padded bitmap index in a physical storage unit.

11. The method according to claim 10, wherein determining said suitable padding factor is based on population or subpopulation distribution relevant to each of said features of said dataset.

12. The method according to claim 11, wherein determining said suitable padding factor is based on a quantitative factor which comprises the following mathematical or statistical factors of: first and second derivative degrees of the population distribution of each said feature of said dataset.

13. The method according to claim 10, wherein said non-zero values are added symmetrically on both sides of said target bit locations.

14. The method according to claim 10, wherein said non-zero values are added asymmetrically on both sides of said target bit locations.

15. The method according to claim 10, wherein each feature comprises one of:
   nominal, ordinal, continuous or fuzzy variable.

16. The method according to claim 10, used for determining similarities between different cases or features by comparing non-zero numerical values in matching locations in a plurality of different padded bitmap indexes of the same dataset.

17. The method according to claim 10, wherein said non-zero numerical value replacing each said adjacent '0' bit is a '1' bit, thereby creating a binary padded bitmap indexing representation of said respective feature of said respective case.

18. The method according to claim 10, wherein said non-zero numerical value replacing each said adjacent '0' bit is a numerical value representing a probability factor associated with the original value of said respective feature of said respective case.

19. The method according to claim 18, wherein said probability value is determined according to at least one condition, said condition relates to the original value of said respective feature of said respective case.

* * * * *